US006840295B2

United States Patent
Ruffa

(10) Patent No.: US 6,840,295 B2
(45) Date of Patent: Jan. 11, 2005

(54) PUNCTURE PROOF TIRE EMPLOYING AN ELONGATED BODY TUBE HAVING SHEAR RESISTANT FILM

(75) Inventor: Anthony A. Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 27 days.

(21) Appl. No.: 10/385,448

(22) Filed: Mar. 12, 2003

(65) Prior Publication Data

US 2003/0168141 A1 Sep. 11, 2003

Related U.S. Application Data

(62) Division of application No. 09/090,225, filed on May 22, 1998, now Pat. No. 6,539,994.

(51) Int. Cl.[7] .............................. B60C 5/20; B60C 7/12; B60C 17/00; B60C 19/12
(52) U.S. Cl. ....................... 152/157; 152/316; 152/322; 152/331.1
(58) Field of Search ................................. 152/157, 158, 152/165, 166, 316, 317, 320, 322, 516, 331.1, 310–312, 328; 156/113, 119

(56) References Cited

U.S. PATENT DOCUMENTS

| 487,419 A | * | 12/1892 | Lee ............................ 152/328 |
| 1,012,161 A | * | 12/1911 | Roberts .................. 152/322 X |
| 2,142,962 A | * | 1/1939 | Conklin ...................... 152/322 |
| 2,171,805 A | * | 9/1939 | Picard .................... 152/157 X |

FOREIGN PATENT DOCUMENTS

| DE | 19 53 824 | * | 5/1971 | ................ 152/316 |

* cited by examiner

Primary Examiner—Adrienne C. Johnstone
(74) Attorney, Agent, or Firm—James M. Kasischke; Michael F. Oglo; Jean-Paul A. Nasser

(57) ABSTRACT

The invention is directed to a high-speed, puncture proof tire including a tire casing having a tread portion and a pair of side wall portions and a plurality of small diameter pressurized tubes disposed within the tire casing. Each pressurized tube has an elongate body fabricated from film material that is sealed crosswise along the length of the body to define at least two compartments that contain gas under pressure. The tubes can be oriented radially or circumferentially within the annular space of the tire casing. In another embodiment of the tire, at least one panel of film material resistant to shear forces is disposed within the annular space of the tire casing. The panel is sealed lengthwise thereof to define a plurality of small diameter pressurized tubes. Each pressurized tube is sealed crosswise along the length of the tube to define at least two compartments that contain gas under pressure.

13 Claims, 2 Drawing Sheets

PUNCTURE PROOF TIRE EMPLOYING AN ELONGATED BODY TUBE HAVING SHEAR RESISTANT FILM

CROSS REFERENCE TO OTHER PATENT APPLICATIONS

This application is a division of the patent application Ser. No. 09/090,225, filed 22 May 1998, now U.S. Pat. No. 6,539,994.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates generally to vehicle tires, and more particularly to a high-speed, puncture proof tire.

(2) Description of the Prior Art

Puncture proof tires are well known in the art. In this regard, reference can be made to U.S. Pat. Nos. 487,419 to Lee; U.S. Pat. No. 2,070,066 to Picardi; U.S. Pat. No. 3,127,920 to Hercules; U.S. Pat. No. 4,945,965 to Kim; U.S. Pat. No. 5,180,455 to Cheng, and U.S. Pat. No. 5,385,191 to Aflague et al., as representative prior art in this area.

More specifically, Lee discloses a tire construction having an outer covering and air filled tubular cells formed between compressed areas disposed within the outer covering. As shown in Lee, the cells occupy the entire volume of the outer covering. Picardi shows a pneumatic tire having a tube and a casing disposed around the tube. A plurality of partitions serve to create sealable compartments such that if one compartment is punctured, the other compartments are not deflated. The compartments are positioned throughout nearly the entire volume of the casing. Kim illustrates a tube assembly for tires including a tire casing and a plurality of small inflated balloons positioned adjacent a tread wall of the tire casing. The arrangement is such that upon puncturing the tire, only one of the balloons deflates while the balloons surrounding the punctured balloon expand to occupy the area of the punctured balloon. The remaining patents to Hercules, Cheng, and Aflague et al. are of a more general interest.

Low-speed, puncture proof tires are also well known. In this regard, such tires consist of pressurized foamed rubber that is injected into a conventionally constructed tire and allowed to cure at a specific pressure. Such tires are only appropriate for low-speed applications since at high speeds, the resulting shear forces destroy the pressurized foamed rubber through mechanical tearing.

SUMMARY OF THE INVENTION

The instant invention is directed to a high-speed, puncture proof tire comprising a tire casing having a tread portion and a pair of side wall portions, the tread and side wall portions defining an annular space therewithin. The tire further comprises a plurality of small diameter pressurized tubes disposed within the annular space of the tire casing. Each pressurized tube has an elongate body fabricated from film material resistant to shear forces. The body of each pressurized tube is sealed crosswise along the length of the body to define at least two compartments that contain gas under pressure.

In a second aspect of the invention, a high-speed, puncture proof tire comprises a tire casing and at least one panel of film material resistant to shear forces disposed within the annular space of the tire casing. The panel is sealed lengthwise thereof to define a plurality of small diameter pressurized tubes. Each pressurized tube is sealed crosswise along the length of the tube to define at least two compartments that contain gas under pressure.

In a third aspect of the invention, a high-speed, puncture proof tire comprises a tire casing and a plurality of small diameter pressurized tubes disposed within the annular space of the tire casing. Each pressurized tube has an elongate body fabricated from film material resistant to shear forces wherein the tubes are oriented radially within the annular space of the tire casing.

In a fourth aspect of the invention, a high-speed, puncture proof tire comprises a tire casing and a plurality of small diameter pressurized tubes disposed within the annular space of the tire casing. Each pressurized tube has an elongate body fabricated from film material resistant to shear forces wherein the tubes are oriented circumferentially within the annular space of the tire casing.

Accordingly, it is an object of the present invention to provide an improved high-speed, puncture proof tire which is designed to prevent complete destruction of the tire when impacting a sharp object.

BRIEF DESCRIPTION OF THE DRAWINGS

A more complete understanding of the invention and many of the attendant advantages thereto will be readily appreciated as the same become better understood by reference to the following detailed description when considered in conjunction with the accompanying drawings wherein.

DETAILED DESCRIPTION OF THE PREFERRED EMBODIMENTS

Figure 1:
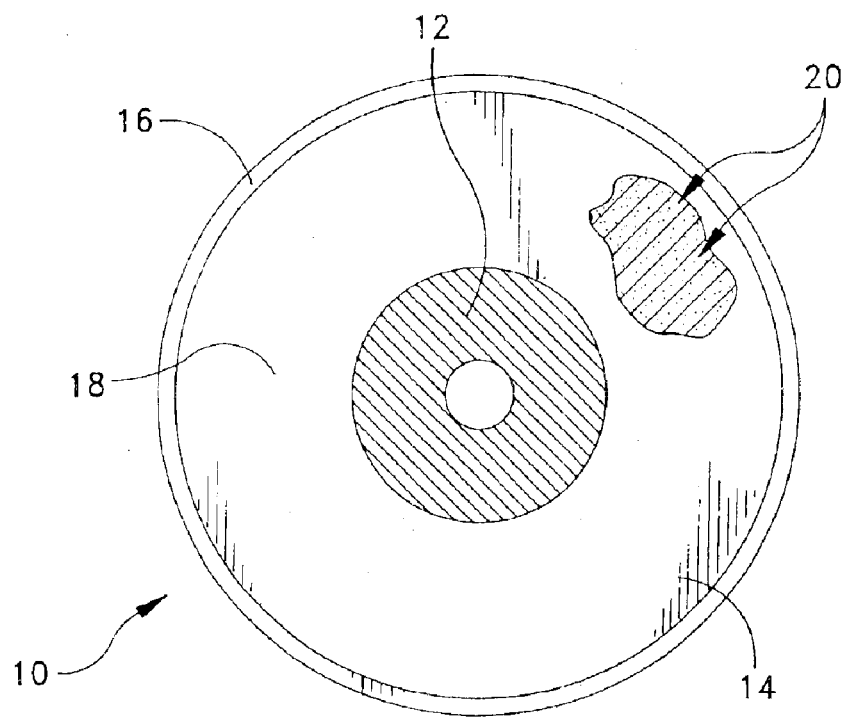
FIG. 1 is an elevational view of a high-speed, puncture proof tire of the present invention with a portion of a side wall of the tire removed for revealing individual small-diameter pressurized tubes contained therein.

Referring now to the drawing figures, and more particularly FIG. 1, there is generally indicated at 10 a high-speed, puncture proof tire of the present invention. The tire 10 of the instant invention improves on the tire constructions disclosed in the Lee, Picardi and Kim patents, along with the prior art low-speed tire described above.

Figure 2:
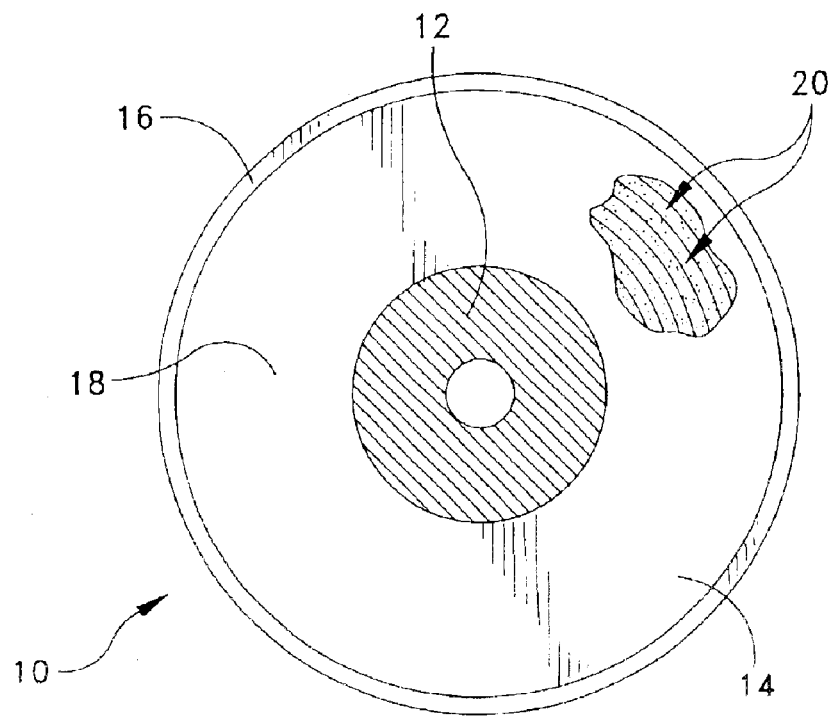
FIG. 2 is an elevational view of a high-speed, puncture proof tire of another preferred embodiment with a portion removed for revealing the pressurized tubes.

As shown, the tire 10 comprises a hub or rim 12 adapted to be secured to a conventional axle and a tire casing 14 mounted on the hub 12 in the well known manner. The tire casing 14 has a tread portion 16 and a pair of side wall portions 18 integrally formed with the tread portion 16. FIGS. 1 and 2 only illustrate one side wall portion 18; however, it is understood that the other side wall portion which is not shown is identically constructed. The tread and side wall portions 16, 18 define an annular space therewithin which, with conventionally constructed tires, is adapted to receive an inner tube.

Moreover, in a typical tire construction, the inner tube is filled with pressurized gas, such as air. However, the tire 10 of the present invention includes a plurality of small diameter pressurized tubes, each generally indicated at 20 in FIGS. 1-3, disposed within the annular space of the tire casing 14. Referring to FIG. 1, the pressurized tubes 20 are oriented radially within the annular space in that they extend from the hub 12 along the side wall portion 18 of the tire casing 14, crosswise along the tread portion 16, and back along the other side wall portion. Turning briefly to FIG. 2, the pressurized tubes 20 are oriented circumferentially within the annular space of the tire casing 14. Preferably, the tubes 20 are bonded by any suitable fashion (e.g., adhesive, heat/pressure bonding, etc.) to the tire casing 14.

Figure 3:
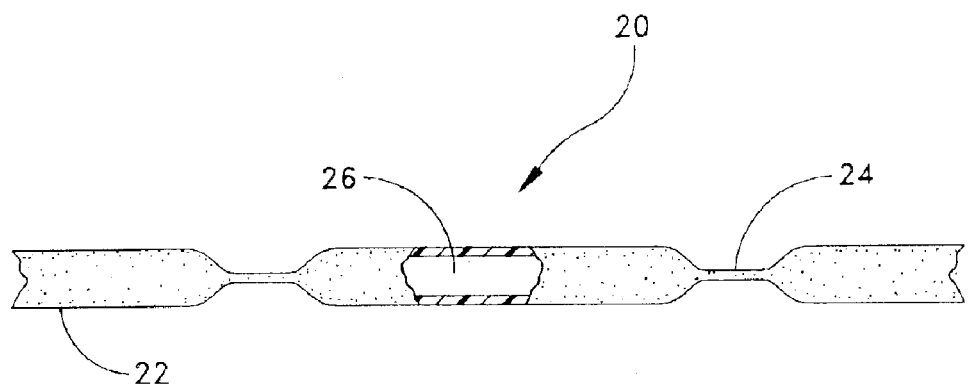
FIG. 3 is an enlarged view of the pressurized tube shown in FIGS. 1 and 2.

The tubes 20 can be fabricated from a variety of film materials that are resistant to shear forces. For example, tubes 20 fabricated from high-density polyethylene film or laminates of high-density and/or low-density polyethylene film are preferred since such films can be produced in mass quantities quickly and cost-efficiently. Referring to FIG. 3, each tube 20 has an elongate body 22 that is sealed crosswise along the length of the body at locations designated by reference numeral 24 so as to define a plurality of compartments 26 that contain pressurized gas. During its manufacture, each tube 20 is pressurized and heat sealed at locations 24. It should be noted that to increase the shear resistance of the tube 20, the tube body 22 diameter, density, thickness, and configuration (e.g., radial or circumferential orientation) can be optimized.

Figure 4:
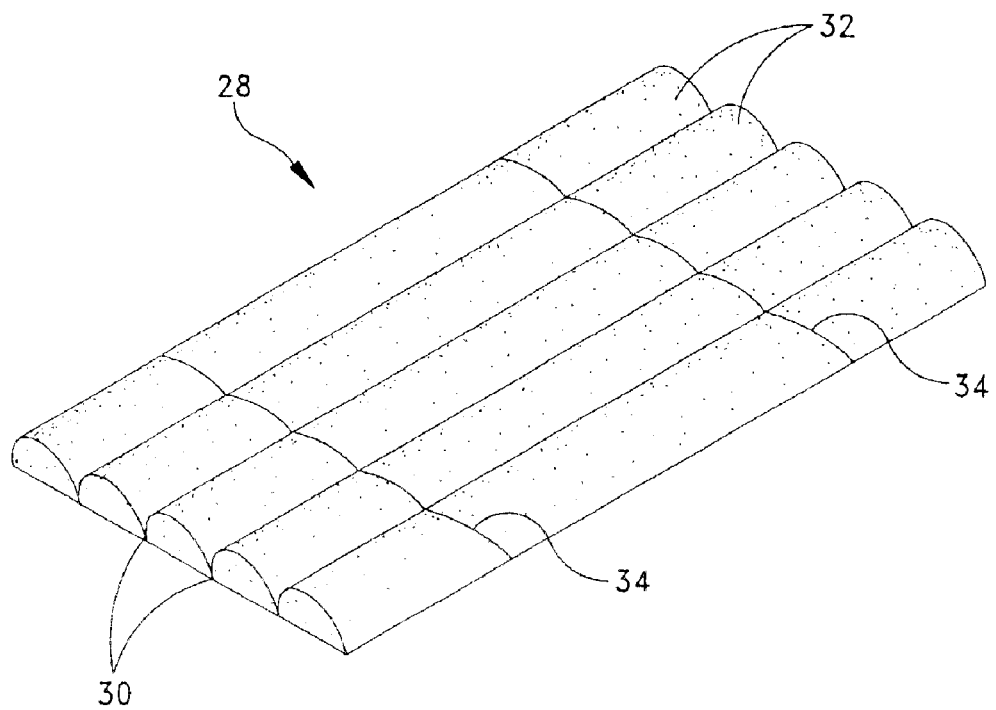
FIG. 4 is a perspective view of a pressurized tube of another preferred embodiment.

Turning now to FIG. 4, there is generally indicated at 28 a panel of film material that can also be utilized in constructing tire 10. Specifically, the panel 28 is sealed lengthwise thereof at locations 30 to define a plurality of small diameter pressurized tubes, each indicated at 32, similar to the tube 20 illustrated in FIGS. 1–3. Each pressurized tube 32 of the panel is sealed crosswise at locations 34 along the length of the tube to define a plurality of compartments that contain pressurized gas. The panel is fabricated from polyethylene film material as described above, and the sealing is preferably achieved by heat sealing.

It should be observed that the tire 10 of the present invention is puncture proof in that any sharp object penetrating the tire wold only puncture a single compartment of a tube (20, 32), or at most two compartments of a tube thereby enabling continued use of the tire 10. Accordingly, for these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A high-speed, puncture proof tire comprising:

a tire casing having a tread portion and a pair of side wall portions, the tread and side wall portions defining an annular space therewithin; and a plurality of small diameter pressurized tubes disposed within the annular space of the tire casing, each pressurized tube having an elongate body fabricated from film material resistant to shear forces, the film material being selected from the group consisting of high-density polyethylene film, laminates of high-density polyethylene film, and laminates of low-density polyethylene film, the body of each pressurized tube being sealed crosswise along the length of the body to define at least two compartments that contain gas under pressure.

2. A tire as set forth in claim 1, said tubes each being fabricated from high-density polyethylene film.

3. A tire as set forth in claim 1, said tubes each being fabricated from laminates of high-density polyethylene film.

4. A tire as set forth in claim 3, said tubes being oriented radially within the annular space of the tire casing.

5. A tire as set forth in claim 1, said tubes each being fabricated from laminates of low-density polyethylene film.

6. A tire as set forth in claim 1, said tubes being oriented radially within the annular space of the tire casing.

7. A tire as set forth in claim 1, said tubes being oriented circumferentially within the annular space of the tire casing.

8. A tire as set forth in claim 7, said tubes each being fabricated from high-density polyethylene film.

9. A tire as set forth in claim 7, said tubes each being fabricated from laminates of low-density polyethylene film.

10. A tire as set forth in claim 1, said sealing of each tube being achieved by heat sealing.

11. A tire as set forth in claim 1, said tubes being bonded to the tire casing.

12. A high-speed, puncture proof tire comprising:

a tire casing having a tread portion and a pair of side wall portions, the tread and side wall portions defining an annular space therewithin; and a plurality of small diameter pressurized tubes disposed within the annular space of the tire casing, each pressurized tube having an elongate body fabricated from film material resistant to shear forces, the film material being selected from the group consisting of high-density polyethylene film, laminates of high-density polyethylene film, and laminates of low-density polyethylene film, said tubes being oriented radially within the annular space of the tire casing.

13. A high-speed, puncture proof tire comprising:

a tire casing having a tread portion and a pair of side wall portions, the tread and side wall portions defining an annular space therewithin; and a plurality of small diameter pressurized tubes disposed within the annular space of the tire casing, each pressurized tube having an elongate body fabricated from film material resistant to shear forces, the film material being selected from the group consisting of high-density polyethylene film, laminates of high-density polyethylene film, and laminates of low-density polyethylene film, said tubes being oriented circumferentially within the annular space of the tire casing.

* * * * *